Patented Mar. 9, 1948

2,437,410

UNITED STATES PATENT OFFICE 2,437,410

MANUFACTURE OF HYDROXY ACIDS

Karl Heinrich Walter Tuerck, Banstead, and Hans Joachim Lichtenstein, Epsom, England, assignors to The Distillers Company, Limited, Edinburgh, Scotland, a British company No Drawing. Original application November 20, 1943, Serial No. 511,120, now Patent No. 2,411,700, dated November 26, 1946. Divided and this application June 11, 1946, Serial No. 676,094. In Great Britain April 28, 1942

7 Claims. (Cl. 260—530)

This invention is for improvements in or relating to the manufacture of hydroxy acids.

This application is a division of application Serial No. 511,120, filed November 20, 1943, which has issued as Patent No. 2,411,700, November 26, 1946.

Hydroxy acids have hitherto been obtained by the hydroxylation of the corresponding unsaturated acid, for example β-hydroxybutyric acid has been prepared by heating crotonic acid with dilute sulphuric acid for a long period of time. The disadvantages of such a method are the low yields obtained (of the order of 6%), the difficulty of separating the hydroxy acid from the unsaturated acid and the losses of material attendant upon the uneconomic process of recovery of the products from dilute aqueous solutions. Other methods which have been proposed, such as, for example, the oxidation of the corresponding aldehyde by the use of silver oxide, are of academic interest only and have no technical application.

We have now found a new method whereby the β-hydroxy carboxylic acids can be produced on a commercial scale.

There is no suggestion in published works that such hydroxy-aldehydes are autoxidizable as are the simple aldehydes such as acetaldehyde and crotonaldehyde. On the contrary, it has been stated (see Wurtz, Comptes Rendues, volume 76, page 1167) that aldol when heated with dry air splits off the elements of water and sets to a vitreous mass which is insoluble in water.

The present invention is based upon the discovery that hydroxy-aldehyde can be subjected to oxidation in the presence of oxygen carriers to produce the corresponding acids, which is a somewhat surprising result as it is well known that β-hydroxy aldehydes tend to split off the elements of water very readily.

According to the present invention, a process for the manufacture of a β-monohydroxy-carboxylic acid comprises oxidising a β-monohydroxy aldehyde in the liquid phase by passing in molecular oxygen or a gas containing it at an oxygen pressure greater than the partial pressure of oxygen in air, at an elevated temperature and in the presence of an oxygen carrier catalyst whilst maintaining intimate contact between said molecular oxygen and said β-monohydroxyaldehyde.

Preferably the temperature at which the oxidation is effected lies between 40° C. and the normal decomposition temperature of the hydroxy-aldehyde. The oxygen carrier catalysts, of course, must be substances which do not act on the hydroxyl group either of the aldehyde starting material or the acid product under the conditions obtaining during the reaction.

The hydroxy-aldehydes which can be oxidised in accordance with the present invention are especially those aliphatic hydroxy-aldehydes having less than eight carbon atoms in the molecule, for example, hydracrylaldehyde and acetaldol or their α-halogen substitution products such as α-chloroacetaldol and α-chloro-hydracrylaldehyde.

We have found that the oxidation may readily be carried out even if the acetaldol used contains (as is frequently the case with the commercial product) more than 50% by weight of acetaldehyde either as such, or in the form of a compound with acetaldol which readily dissociates at elevated temperature into free acetaldehyde and acetaldol. We have in fact found that oxidation of such a material proceeds more rapidly than with pure acetaldol.

In this case it is advisable to start the oxidation at a relatively low temperature, e. g., about 35° C., at which temperature the oxidation of acetaldehyde is the principal reaction, and, when the major proportion of the acetaldehyde has been oxidised, gradually to raise the temperature to a final temperature of 55°–70° C., the main bulk of the acetaldol being oxidised during the later stages of the reaction.

Intimate contact of the oxygen or oxygen-containing gas with liquid acetaldol is necessary throughout the oxidation and this may, for example, be accomplished by efficient stirring or by causing the liquid-gas mixture to flow through suitable reactors in a state of turbulence.

The oxygen carrier catalysts which have been found to be satisfactory in use and to exercise a catalytic effect on the oxidation reaction are vanadium pentoxide, vanadic acid, compounds of cobalt, copper, uranium and tungsten; manganous acetate, which is a commonly used oxygen carrier type of catalyst for similar oxidations utilising molecular oxygen, is, by itself, not so suitable for the oxidation of the β-hydroxy aldehydes particularly if there are any unsaturated aldehydes in the reaction mixture.

We have found that manganous acetate, in conjunction, or combination, with other catalysts which are able to promote the oxidation, e. g., cobalt acetate, or copper acetate, is, however, a very satisfactory catalyst for the oxidation of acetaldol to beta-hydroxybutyric acid according to the process of our invention, preventing the formation of coloured products. Manganic acetate, is, however, by itself a satisfactory catalyst for the oxidation. Since the state of oxidation of manganese compounds is influenced by the prevailing oxygen concentration, these catalysts are preferably employed when high oxygen concentrations are available so as to maintain the catalyst as far as possible in the manganic state.

We have also found that conditions of oxidation and recovery which we have described above in connection with the conversion of acetaldol to beta-hydroxybutyric acid, apply to the conversion of alpha-chloroacetaldol to alpha-chloro beta-hydroxybutyric acid.

When oxidising the α-chloro substituted β-hydroxy aldehydes it is preferred to use vanadium compounds as catalysts since they retain their activity even in the presence of free inorganic acids such as might be produced by the elimination of hydrogen chloride from the chloroaldehyde.

In most cases, the oxidation reaction will commence at temperatures of about 40° C. but the optimum temperature of the oxidation will, of course, vary with the nature of the aldehyde undergoing reaction. For example, it is advantageous to oxidise the α-halogenated β-hydroxy-aldehydes such as α-chlorohydracryl-aldehyde or α-chloroacetaldol at temperatures between 40° and 80° C. whereas in the case of acetaldol itself we prefer to carry out the oxidation at temperatures lying between 55° and 80° C.

The oxidation of the hydroxyaldehyde to the corresponding hydroxy acid gives improved yields when oxygen is used under increased pressure, and therefore the invention contemplates the use of air, pure oxygen or any suitable oxygen-containing gas under increased pressure to supply the molecular oxygen required for the oxidation at an oxygen pressure greater than the partial pressure of oxygen in air. In the initial stages of oxidation when using acetaldol containing acetaldehyde, the acetaldehyde, as indicated above, is preferentially oxidised and it is during this stage that an excess of oxygen or oxygen-containing gas is best avoided due to the possibility of formation of an explosive mixture of acetaldehyde and oxygen. When, however, there is no longer any free acetaldehyde present, we have found that it is advisable to employ a high concentration of oxygen, i. e., to use a high oxygen pressure and therefore we use either pure oxygen or a gas containing a higher proportion of oxygen than is present in air.

We have further found that still further improvement in the yield obtainable can be achieved by using organic solvents which will keep the hydroxy aldehyde or its para-form dissolved during the oxidation; suitable solvents are the lower fatty acids such as acetic acid, alcohol and ketones such as acetone. Acetic acid is the preferred solvent and may be added as such or formed in situ by the oxidation of acetaldehyde, e. g., that present in impure aldol. The solvents may be distilled off after the oxidation reaction has been completed or, where alcohol has been used as the solvent, the alcohol may be reacted with β-hydroxy acid formed in the reaction to produce the corresponding esters. The reaction mixture may be worked up by distillation of the reaction mixture or by a fractional distillation. On the other hand, where the β-hydroxy acid is a readily crystallizable acid it may be recovered from the reaction mixture by crystallization; alternatively, the acid may be directly esterified in any convenient manner.

We have found that if the distillation of β-hydroxybutyric acid, after distillation under reduced pressure of acetic acid and unchanged acetaldol, is carried out in the presence of steam, in particular superheated steam, or an inert gas, e. g., carbon dioxide or nitrogen, which is passed through the reaction mixture whilst it is maintained at or near its boiling point under a reduced pressure such that the boiling point is about 120°–140° C. an increased yield of β-hydroxybutyric acid can be obtained. If the distillation is carried out in the absence of such diluents, higher condensation products are formed in the still and the boiling point rises to such a point that rapid decomposition and resinification of the reaction products occur. If the distillation is carried out in the presence of superheated steam, dehydration of the β-hydroxybutyric acid to its anhydrides or to crotonic acid is greatly reduced.

We prefer to carry out the separation of the components of the reaction mixture in such a way that the unchanged acetaldol is decomposed to crotonaldehyde. This is because it is difficult to separate acetaldol as such by distillation from its mixture with β-hydroxybutyric acid. If acetic acid is present in the reaction mixture this may be separated by distillation at temperatures slightly in excess of 100° C., and under slight vacuum, under which conditions acetaldol is readily converted to crotonaldehyde, which distills off with the acetic acid. Under these conditions β-hydroxybutyric acid does not distill over. A similar result can be brought about by steam distillation at normal pressure.

Although it has previously been reported that β-hydroxybutyric acid is volatile in steam, we have found that it forms no azeotropic mixture with water or with acetic acid and it is thus possible, by steam distillation under reduced pressure followed by fractional condensation, to obtain a product containing β-hydroxybutyric acid in concentrated form.

The oxidation process may be carried on until the hydroxy-aldehyde is substantially completely oxidised. Any excess of unchanged hydroxy-aldehyde may be distilled off as such, or it may be removed from the reaction mixture by treating the reaction mixture under such conditions that the β-hydroxy-aldehyde will split off the elements of water to yield the unsaturated aldehyde which is then removed from the reaction mixture in any convenient manner, the conditions of treatment being, of course, such as to avoid splitting off the elements of water from the formed hydroxy acid or its esters.

If desired, it is possible, for example, by distilling or heating with sulphuric acid to convert the β-hydroxy acid into the corresponding unsaturated acid by splitting off the elements of water; for example, the α-chlorohydracrylic acid may be converted in this manner to α-chloroacrylic acid.

The following examples illustrate the manner in which the invention may be carried into effect:

*Example 1*

54 grs. of freshly distilled acetaldol were dissolved in 50 grs. of acetic acid and 0.05 gr. of a vanadic acid catalyst was added. Oxygen was passed through this reaction mixture at 55° C. and 1200 mm. Hg pressure for 24 hours. At the end of this period 48 grs. of the acetaldol originally present was found to have been oxidised to acid. After distilling off the acetic acid from the reaction mixture, 25 grs. of β-hydroxybutyric acid distilled over at 125–130° C. at 8 mm. Hg pressure.

Example 2

65 grs. of freshly distilled acetaldol were dissolved in 40 grs. of acetic acid and 0.2 gr. of cobalt acetate were added. Oxygen was passed through the reaction mixture at 60-65° C. and a pressure of 1200 mm. Hg for 27 hours, when it was found that 50 grs. of aldol had been oxidised to acid. Distillation in vacuo gave 35 grs. of β-hydroxy butyric acid.

Example 3

To 83 grs. of freshly distilled acetaldol 0.2 gr. of cobalt acetate were added and oxygen passed through the reaction mixture at 74° C. and 1200 mm. Hg pressure for 60 hours, when 73 grs. of acetaldol had been oxidised to acid. Distillation in vacuo gave 42 grs. of β-hydroxy butyric acid.

Example 4

60 grs. of freshly distilled acetaldol were dissolved in 40 grs. of n-butanol and 0.2 gr. of cobalt acetate were added. Oxygen was passed through the reaction mixture at 55° C. and 1200 mm. Hg pressure. After 24 hrs. 47 grs. of acetaldol had been oxidised to acid. Distillation in vacuo gave 38 grs. of β-hydroxy-butyric acid.

Example 5

50 grs. of α-chloro-β-hydroxy propionaldehyde were dissolved in 50 grs. of acetic acid. Oxygen was passed through the reaction mixture in the presence of 0.05 gr. of a vanadic acid catalyst at 45° C. and 1200 mm. Hg pressure for 18 hours, when all the α-chloro-β-hydroxypropionaldehyde present initially had been oxidised to acid.

After distilling off the acetic acid the products were esterified with ethyl alcohol saturated with hydrochloric acid. The ethyl ester of α-chloro-β-hydroxy propionic acid was obtained as a clear liquid, insoluble in water. B. P. 80-85° C./8 mm. Hg.

Example 6

35 grs. of α-chloroacetaldol were dissolved in 70 grs. of acetic acid. Oxygen was passed through the reaction mixture in the presence of 0.05 gr. of vanadic acid as a catalyst at 55-60° C. and 1200 mm. Hg pressure. After 24 hours all the α-chloroacetaldol present initially had been oxidised.

It has been found that although in Examples 1, 2, 3 and 4 reference has been made to the use of freshly distilled acetaldol, impure aldol, e. g., containing some free acetaldehyde, will react at least as well as the pure acetaldol itself, and therefore the invention is not to be considered as being limited to the oxidation of the pure β-hydroxy aldehyde, as the presence of small amounts of simpler aldehydes has been found not to interfere with the reaction or as already stated, have actually increased the rate of reaction.

Example 7

In a reactor, provided with means for cooling and heating and with a fast-running efficient stirrer, a mixture of 600 parts of acetic acid and 1200 parts of crude aldol are agitated while oxygen is passed at normal pressure at such a rate that about 10% of the volume of the gas introduced leaves the reactor. The crude aldol which is used contains about 50% aldol and 50% acetaldehyde, partly as such and partly combined with aldol. The reaction mixture further contains 2 parts of cobalt acetate, 0.5 part of copper acetate and 0.1 part of manganese acetate. The oxidation starts at 35° C., at which temperature mainly the acetaldehyde present is oxidised to acetic acid. After 2 hours the temperature is raised to 55° C. and finally at 70°-75° C. The oxidation is carried on for four hours at which point the aldol content has dropped to about 5%. The reaction mixture, which contains about 32% β-hydroxybutyric acid and 60% acetic acid is distilled at normal or slightly reduced pressure whilst the temperature in the still, heated indirectly by means of steam, is gradually raised to 140° C., live steam being admitted after the bulk of the acetic acid has distilled off. Finally, the pressure is reduced to 12 mm. and the β-hydroxybutyric acid distilled over with live steam at 120° to 135° C. at a strength of 90%. By the use of fractional condensation (e. g., by maintaining the first condenser at 50° C.) an acid of more than 96% strength can be obtained. The temperature in the still remains constant until all the acid has been distilled. A residue of 21 parts by weight remains in the still, the residue being easily removable since it shrinks (on cooling) to a brittle non-adherent powder easily soluble in acetic acid.

The acetic acid was obtained as an 82% acid, containing crotonaldehyde formed from the unreacted aldol. It is easily freed from crotonaldehyde by fractional distillation, an azeotropic mixture of water and crotonaldehyde being obtained as head product, boiling at 84° C. at normal pressure. Only 1.5% of the β-hydroxybutyric acid was found in the acetic acid fraction.

If the reaction mixture was distilled at 10 mm. without the aid of steam, the temperature rose steadily from 120° to 160° C. and during the later stages of distillation, dehydration of β-hydroxybutyric acid to crotonic acid occurs. In this case a somewhat sticky residue amounting to 75 parts by weight was obtained.

We have found that, even at concentrations as low as 5% by weight of acetaldol, the oxidation to β-hydroxybutyric acid will proceed at a satisfactory rate and that we can therefore carry out the reaction in a continuous manner. The following example illustrates the continuous method of operation.

Example 8

A mixture of acetic acid and crude acetaldol is oxidised in an oxidiser as in Example 7 the said oxidiser however being provided with means for continuously feeding in the crude acetaldol and with means for continuously drawing off part of the reaction liquors.

The oxidation is carried out as described in Example 7 until the acetaldol content of the reaction liquor has dropped to 10% by weight after which crude acetaldol, containing 0.1% by weight of copper acetate and 0.1% by weight of cobalt acetate, is continuously fed in at such a rate that the acetaldol content of the reaction liquor in the oxidiser is maintained at about 10% by weight.

An amount of the reaction liquors, corresponding to the volume of input of crude acetaldol, is continuously withdrawn from the oxidiser and unreacted acetaldol is stripped therefrom by means of steam in such a manner that it is converted to crotonaldehyde as hereinbefore described.

In this manner, 100 grams of crude aldol can be oxidised per hour giving a yield of β-hydroxybutyric acid amounting to 85% based on the acetaldol treated.

The temperature at which the reaction is carried out is maintained at 70° C. throughout; if necessary a scrubbing column for recovering acetaldehyde from the effluent gases may be provided.

Instead of utilising the oxidiser described, any other arrangement may be used which will give the necessary intimate contact between the reactants. If a packed column is used for the reaction vessel it is preferred to operate with such a rate of flow that the liquid-gas mixture exhibits turbulent flow throughout the contact, or reaction, zone.

What we claim is:

1. A process for the manufacture of alpha-chloro-beta-hydroxy propionic acid which comprises oxidising alpha-chloro-beta-hydroxy propionaldehyde in solution in an organic solvent substantially inert under the conditions of oxidation and not destructive of the said aldehyde and other reaction products of the process by the action of molecular oxygen, at an oxygen pressure greater than the partial pressure of oxygen in air, at a temperature between 40° and 80° C. and in the presence of vanadic acid as oxidation catalyst whilst maintaining intimate contact between said molecular oxygen and said aldehyde to produce a reaction mixture containing alpha-chloro-beta-hydroxy propionic acid.

2. A process for the manufacture of alpha-chloro-beta-hydroxy butyric acid which comprises oxidising alpha-chloro-acetaldol in solution in an organic solvent substantially inert under the conditions of oxidation and not destructive of the said aldehyde and other reaction products of the process by the action of molecular oxygen, at an oxygen pressure greater than the partial pressure of oxygen in air, at a temperature between 40° and 80° C. and in the presence of vanadic acid as oxidation catalyst whilst maintaining intimate contact between said molecular oxygen and said aldehyde to produce a reaction mixture containing alpha-chloro-beta-hydroxy butyric acid.

3. A process for the manufacture of alpha-chloro-beta-hydroxy propionic acid which comprises oxidising alpha-chloro-beta-hydroxy propionaldehyde in solution in acetic acid by the action of molecular oxygen, at an oxygen pressure greater than the partial pressure of oxygen in air, at a temperature between 40° and 80° C. and in the presence of vanadic acid as oxidation catalyst whilst maintaining intimate contact between said molecular oxygen and said aldehyde to produce a reaction mixture containing alpha-chloro-beta-hydroxy propionic acid.

4. A process which comprises, oxidising a substance selected from the group consisting of alpha-chloro-acetaldol and alpha-chloro-beta-hydroxy propionaldehyde by the action of molecular oxygen at a pressure greater than one-fifth of an atmosphere, at a temperature between 40° and 80° C. and in the presence of an oxygen-carrier catalyst, whilst maintaining intimate contact between said molecular oxygen and said substance to produce a reaction mixture containing the acid corresponding to such substance, said oxidation catalyst being selected from the group consisting of the compounds of vanadium, cobalt, copper and manganese.

5. A process according to claim 4 wherein vanadic acid is employed as the oxygen-carrier catalyst.

6. A process according to claim 4 wherein vanadic acid is employed as the oxygen-carrier catalyst and the reaction is carried out in the presence of acetic acid.

7. A process which comprises, oxidising alpha-chloro-acetaldol dissolved in acetic acid by the action of molecular oxygen at a pressure greater than one-fifth of an atmosphere, at a temperature between 40 and 80° C., and in the presence of vanadic acid, whilst maintaining intimate contact between said molecular oxygen and said alpha-chloro-acetaldol solution to produce a reaction mixture containing alpha-chloro-beta-hydroxy butyric acid.

KARL HEINRICH WALTER TUERCK.
HANS JOACHIM LICHTENSTEIN.

REFERENCES CITED

The following references are of record in the file of this patent:

UNITED STATES PATENTS

| Number | Name | Date |
|---|---|---|
| 1,721,958 | James | July 23, 1929 |
| 1,778,511 | Rowell et al. | Oct. 14, 1930 |
| 1,828,356 | Burwell | Oct. 20, 1931 |
| 1,895,799 | James | Jan. 31, 1933 |
| 1,934,161 | Barsky | Nov. 7, 1933 |
| 1,951,789 | Mueller-Cunradi et al. | Mar. 20, 1934 |
| 2,000,604 | Malm et al. | May 7, 1935 |
| 2,109,700 | James | Mar. 1, 1938 |
| 2,212,900 | Groll et al. | Aug. 27, 1940 |
| 2,220,506 | Blount | Nov. 5, 1940 |
| 2,287,537 | Schulz | June 23, 1942 |

FOREIGN PATENTS

| Number | Country | Date |
|---|---|---|
| 405,173 | Great Britain | Feb. 1, 1934 |
| 573,334 | Great Britain | Nov. 28, 1945 |